Nov. 26, 1929.    H. H. MERCER    1,737,507
DRILLING MECHANISM
Filed Oct. 22, 1923    7 Sheets-Sheet 1

Nov. 26, 1929.   H. H. MERCER   1,737,507
DRILLING MECHANISM
Filed Oct. 22, 1923   7 Sheets-Sheet 2

Nov. 26, 1929.  H. H. MERCER  1,737,507
DRILLING MECHANISM
Filed Oct. 22, 1923  7 Sheets-Sheet 3

Inventor:
Henry H. Mercer
by
Horace L. ...
atty.

Nov. 26, 1929.  H. H. MERCER  1,737,507
DRILLING MECHANISM
Filed Oct. 22, 1923   7 Sheets-Sheet 4

Nov. 26, 1929.  H. H. MERCER  1,737,507
DRILLING MECHANISM
Filed Oct. 22, 1923  7 Sheets-Sheet 5

Inventor
Henry H. Mercer,
by
atty.

Inventor:
Henry H. Mercer.

Nov. 26, 1929.  H. H. MERCER  1,737,507
DRILLING MECHANISM
Filed Oct. 22, 1923    7 Sheets-Sheet 7

Inventor:
Henry H. Mercer

Patented Nov. 26, 1929

1,737,507

UNITED STATES PATENT OFFICE

HENRY H. MERCER, OF CLAREMONT, NEW HAMPSHIRE, ASSIGNOR TO SULLIVAN MACHINERY COMPANY, A CORPORATION OF MASSACHUSETTS

DRILLING MECHANISM

Application filed October 22, 1923. Serial No. 669,978.

This invention relates to drilling mechanism.

It has for its object to provide an improved type of drilling mechanism particularly adapted for drilling large holes of moderate length. Further objects are,—to provide improved means for cleansing the hole, improved control means for feeding the drill mechanism including improved braking mechanism, means for initially guiding the drill upon starting, and improved means for tightening the driving belt and feed cable. Other objects and advantages of my invention will hereinafter appear.

In the accompanying drawings I have shown for purposes of illustration one main form and a modification thereof which my invention may assume in practice.

In these drawings,—

In the illustrative embodiment of my invention it comprises a triangular shaped frame 1 having mounted at its apex steering mechanism comprising an axle 2 and wheels 3. Mounted on the drilling end of the frame is an axle 4 having wheels 5. Positioned rearwardly of the axle 4 and upon longitudinal frame members 6 are vertical guides 7 having braces 8 connected with the frame 1. The drilling mechanism proper, mounted within the vertical guides 7 and carrying a suitable drill steel hereinafter mentioned, comprises upper and lower guided members 9 and 11 connected by rods 10 to form a rigid unit. This unit is held in any desired vertical position or moved by suitable means hereinafter referred to.

Figure 5:
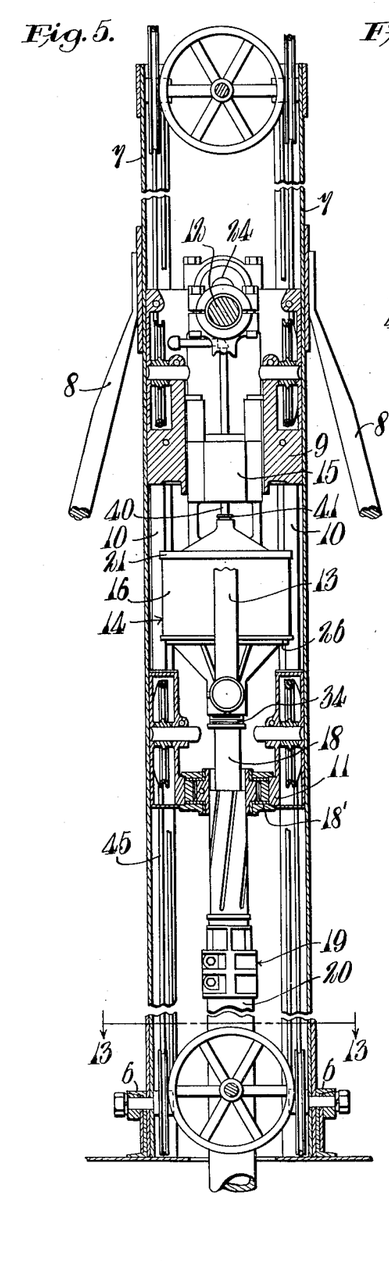
Fig. 5 is a vertical transverse sectional view of the drilling mechanism proper taken on line 5—5 of Fig. 7.
Figure 6:
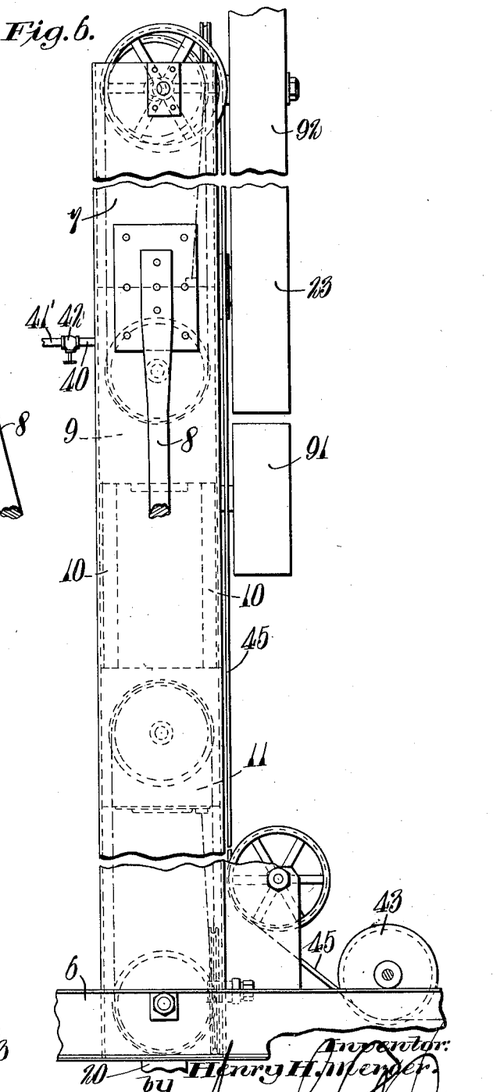
Fig. 6 is a fragmentary side elevation of the drilling mechanism proper.
Figure 14:
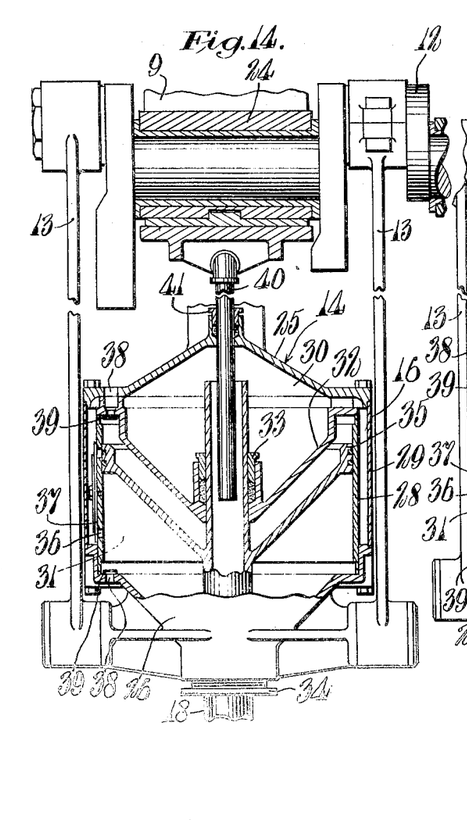
Fig. 14 is an enlarged sectional detail of the fluid generating and connecting means.

The above unit carries improved means for generating pressure fluid to cleanse the hole and also to pneumatically transmit actuating force to the steel. The generating means described in this application is adapted to allow an external source of hole cleansing fluid to be passed through the drill steel independently of the fluid generation. The generating means comprising a double throw crank shaft 12, Fig. 14, provided with a combined flywheel and pulley 23, is journaled as at 24 in the upper member 9 and has connecting rods 13 pivotally connected to the opposite lower sides of the fluid generating means 14. A cross head 15 movably supported by the member 9 is connected to and guides the depending cylinder 16 of the generating means (Fig. 5). Projecting downwardly from within the cylinder is a piston rod 18 passing through rotating mechanism 18' to cause rotation of the drill as it reciprocates. Mounted upon the lower end of the rod 18 is a chuck 19 adapted to connect the steel 20 of relatively large diameter to the rod 18. The cylinder 16 comprises upper and lower heads 25 and 26 vertically spaced by the laterally spaced cylinder lining 28 and outer wall 29. The cylinder interiorly comprises upper and lower chambers 30 and 31 formed by an intermediate wall 32 carrying a packing gland 33. The rod 18 projects upwardly through glands 34, 33, terminating short of the top 25 and carries a piston 35 shaped to match the inclined portions 26 and 32. Exhaust ports 36 positioned in the cylinder lining are covered by valves 37. Atmosphere communicates with the chambers 30, 31 through inlet ports 38 and valves 39.

The operation of the device so far is as follows: The pulley 23 is actuated, by means described later, causing reciprocation of the cylinder relative to the piston, thereby compressing air into the annular chamber surrounding the cylinder lining from which it passes through the upper ports 36 and into the upper chamber 30, thence down through the hollow rod 18 to the steel. The air trapped within the cylinder 28 caused by the piston overriding the ports 36, will cause the piston to be moved with the cylinder. Upon reverse movement of the cylinder the piston will be moved to the bottom of the cylinder 28, trapping air in the bottom thereof and causing the piston to be moved upwardly. Additional means for blowing out the hole comprises a stationary pipe 40, carried by member 9, which projects downwardly through a gland 41 carried by cover 25 of the reciprocating cylinder 16 and into the upper part of the shaft 18. Any flexible air hose 41' can be attached to the end of the pipe near the valve 42 which controls the pressure fluid from any external source (not shown). Thus, when the machine is in operation, the external source of fluid may be admitted to the hole independently of the operation of the fluid generating means.

Figure 7:
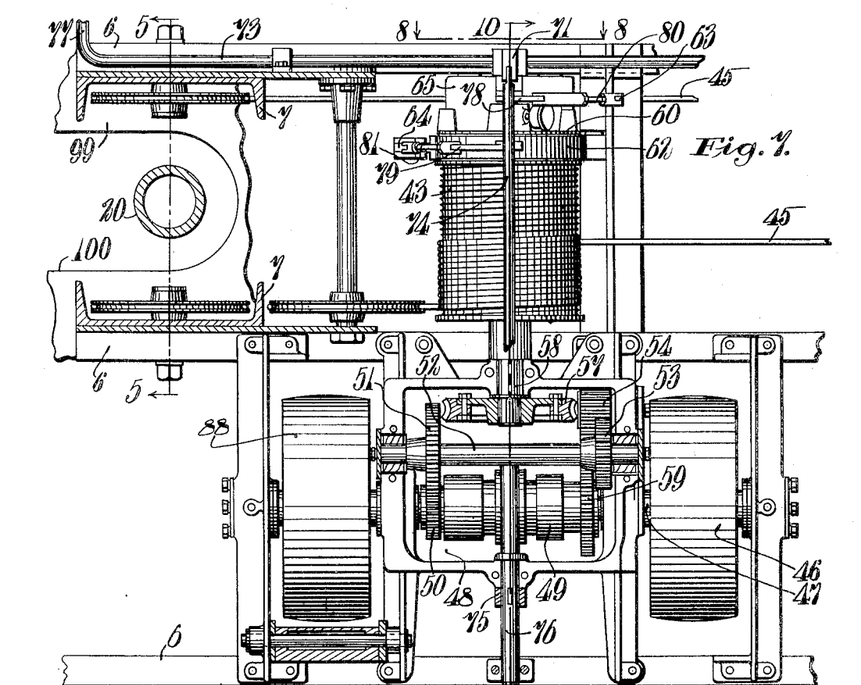
Fig. 7 is a horizontal sectional view showing the feed actuating means for the drilling mechanism.
Figure 8:
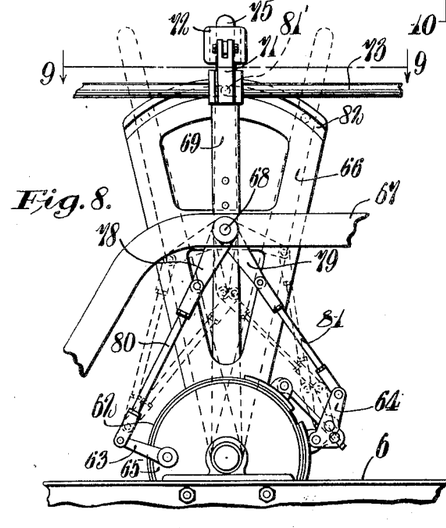
Fig. 8 is a fragmentary side elevation of the brake control means taken on line 8—8 of Figs. 7 and 10.
Figure 9:
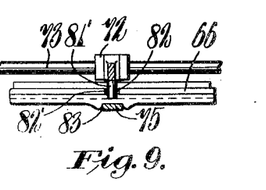
Fig. 9 is a fragmentary plan view of a detail of the control means taken on line 9—9 of Fig. 8.

The cable and pulley system for raising and lowering the drilling mechanism just described is fully disclosed in a prior case and hence will only be briefly described. This means comprises the usual rotatable drum 43, Fig. 7, and cable tightener 44, Figs. 1 and 3, around which the cable 45 passes from which it winds its way through the various sheaves carried by members 9, 11 and guides 7 and is finally connected to the members 9, 11. With the exception of the improved cable tightener, this feature is not per se a part of my present invention, hence it will be stated that it operates exactly the same as in my prior case. The means for tightening the feeding cable comprises a plate 125 mounted upon the main frame 1. Spaced parallel groove forming members 126 are mounted upon the plate 125. A sheave 127 is rotatably mounted in a bracket 128 which has flanges 129 slidable in the grooves formed by the members 126, thus restraining the member 128 to movement within the space between the parallel members 126. A bolt 130 projects forwardly through an abutment 131 formed on the main frame 1 and the rear wall 132 of the member 128. A spring 133 encircles the bolt on the forward side of the wall 132 and is held in engagement therewith by adjusting means herein in the form of a nut 134. By adjusting the nut, tension of the spring and thereby the cable will be increased.

One phase of the invention relates more specifically to the means for controlling the drum 43. The operating mechanism for this drum comprises a driving pulley 46 mounted upon shaft 47 which extends through the gear casing 48 mounted upon a sub-frame structure carried by the main frame, and cooperates with clutch mechanism 49. The gear mechanism includes a pinion 50 on one end of the clutch meshing with gear 51 rotatably mounted on shaft 52, the other end of which carries a pinion 53 meshing with gear 54 fixed on shaft 55 carrying a worm 56 which meshes with a worm wheel 57 fixed upon the rotatable shaft 58 carrying the cable drum 43. This gear train is used to feed the drill mechanism downwardly due to the low speed ratio between the driving shaft 47 and shaft 58. The gear means for raising the drill comprises a pinion 59 carried on the right hand side of the friction clutch which meshes directly with the gear 54 thus causing reverse movement of the shaft 58 and a comparatively high speed ratio. In order to hold the drill in any desired position, a brake drum 60 is mounted upon the outer end of the drum 43. Cooperating therewith are inner and outer brake bands 61, 62 operated in any well known manner as by levers 63, 64, the lever 64 being carried by a shaft mounted in a stationary flange 65, while the arm 63 is supported by the brake band as is customary.

Means are provided for actuating the clutch 49 and brakes 61, 62 from a single source. This means, Figs. 1 and 10, comprises a cross shaft 68, disposed transversely of the frame, mounted at one end on a segment 66 fixed on and projecting upwardly from the casing 48 and at the other end by a supporting member 67 mounted on the opposite side of the drum 43. Projecting upwardly from shaft 68 are arms 69 carrying a cross brace 70 one end of which terminates in a brace for supporting a pivotal arm 71, while the other end terminates in a brace for supporting a pivotal latch 72 which is carried upon and actuated by a rotatable and longitudinally slidable shaft 73 having hand grips 77, Fig. 1. Link 71 and latch 72 are connected by rod 74, the latch 72 having a vertical recess to receive the upper end of the clutch actuating lever 75 which is fixed to a pivotally mounted clutch shaft 76 carrying the usual yoke construction for operating the clutch. Fixed to and projecting downwardly from the left hand arm 69 (Figs. 8 and 10) are two arms 78, 79 to which are pivotally connected rods 80 and 81 connecting the brake levers 63, 64 respectively.

Figure 10:
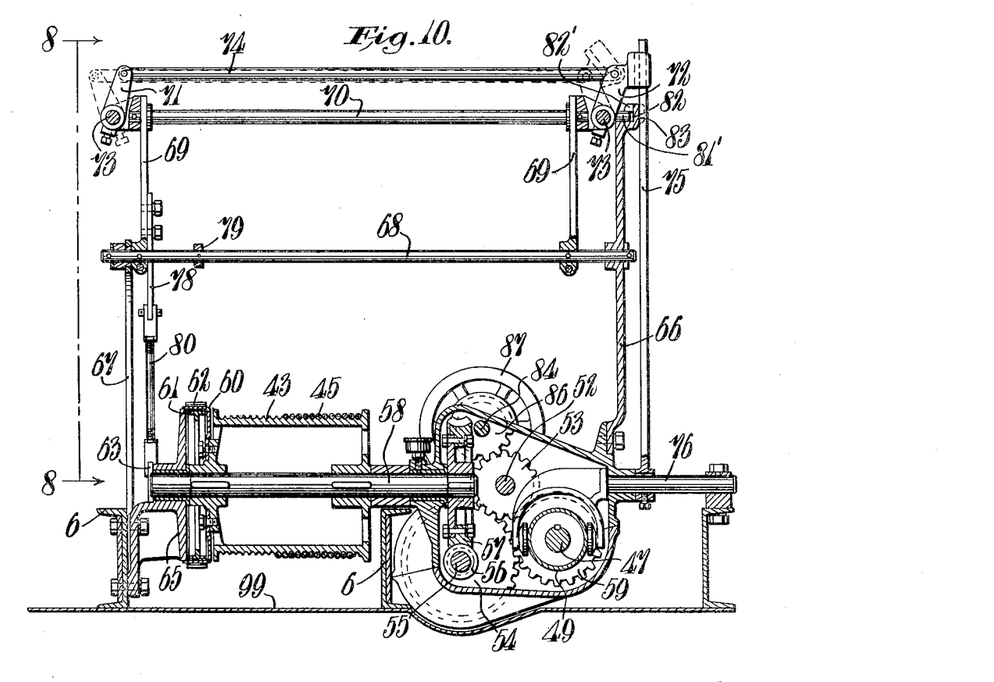
Fig. 10 is a vertical transverse section showing control levers for the brake and feeding mechanism taken on line 10—10 of Figs. 2 and 7.

The operation of this mechanism is as follows: Assuming the power pulley 46 to be running, due to a suitable belt connection with any external source of power (not shown) or from motive means shown in dotted lines on the frame 1 of Fig. 1, the arms 69 are brought to a vertical position which causes both of the brakes to be simultaneously locked. If it is desired to lower the drill, the rod 73 without any rotation is moved to the right, Fig. 1. This causes the shaft 76 to be rotated due to the engagement of the latch 72 with the upper portion of the lever 75 as shown in Fig. 10, thus throwing the clutch in engagement causing operation of the low speed gears. Movement of the shaft 73 releases the brakes due to simultaneous movement of the arms 78, 79 to the position shown in dotted lines. Means are provided for preventing the shaft 73 from being turned except when in its vertical or neutral position at which time the brake is on. This means comprises a groove 82 in the rear side of the segment 66 which has a radius of curvature equal to the distance between the shafts 68 and 70, there being a vertical slot 82' connecting with groove 82. A pin 81' carried by arm 72 will on account of the groove 82 prevent rotation of shaft 73 except when in neutral position when pin 81' can pass upwardly through slot 82'. This arrangement prevents the brakes from being applied while power is transmitted. The front side of the segment has a vertical recess 83 within which the lever 75 rests. The recess in the latch 72 is of sufficient depth to permit the arm 75 to be sprung outwardly from the recess 83 upon sufficient force being applied to the lever and still retain engagement therewith. To release the power and throw on the brakes, it is only necessary to pull the shaft 73 back to its original position which will automatically disengage the clutch and apply both of the brakes simultaneously. To raise the drill steel, the shaft 73 is pulled in the opposite direction which releases both brakes and causes the right hand clutch mechanism to function, thereby causing reverse movement of the drum and consequent raising of the drill steel. To release the brake and still keep the clutch mechanism in neutral, the shaft 73 is first brought to the neutral position, thereby allowing lever 75 to fall into recess 83, the shaft 73 then being rotated in a counter-clockwise direction which disengages latch 72 and lever 75 as shown in dotted lines in Fig. 10. Thereupon the shaft 73 can be longitudinally shifted, causing movement of arms 78, 79 and consequent releasing of the brakes. This will allow the drum 43 to be rotated independently of the power means as the lever 75 held in notch 83 holds the clutch in neutral position.

Figures 1, 17, 18:
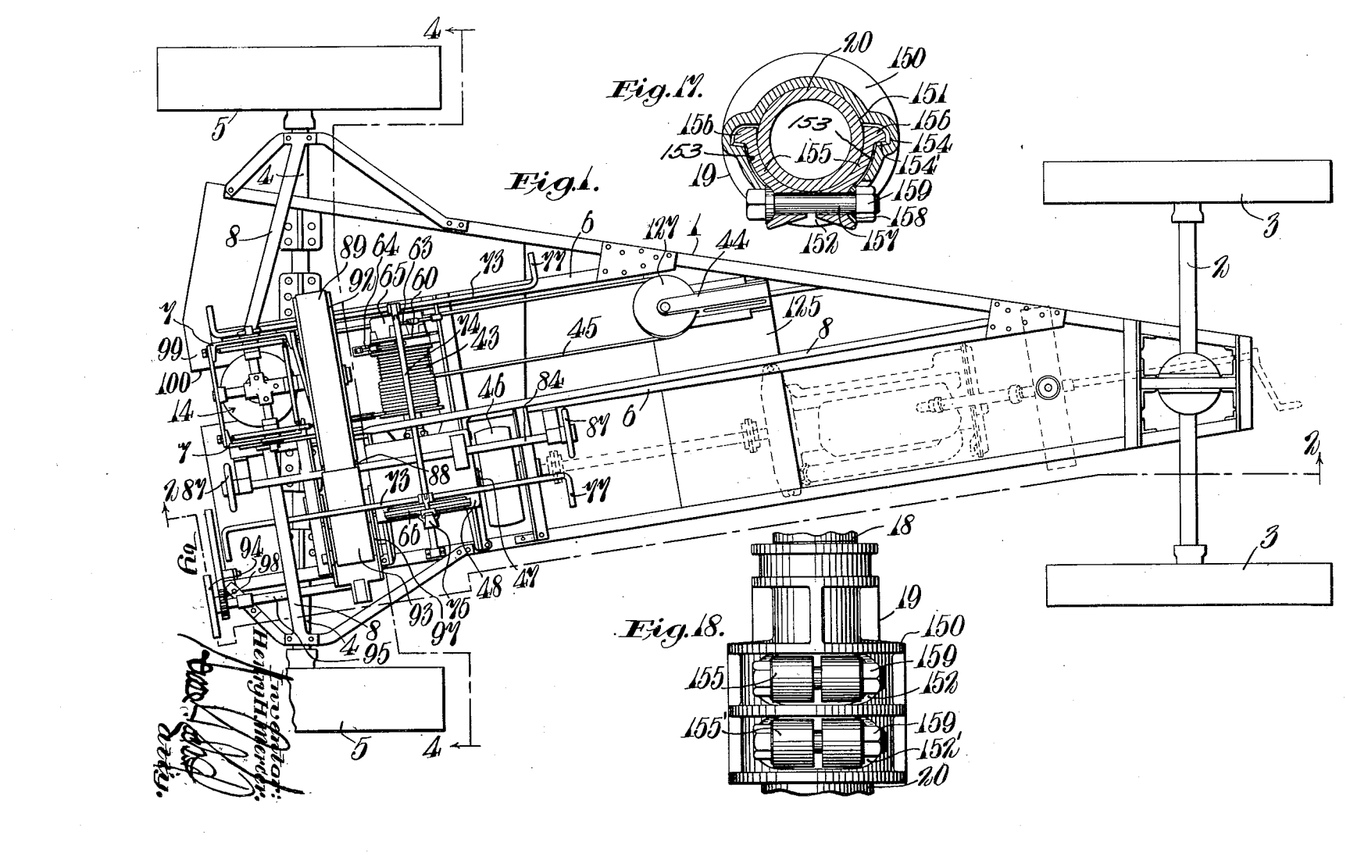
Fig. 1 is a plan view of the whole mechanism.
Figs. 17 and 18 are transverse sectional and elevational views respectively of the chuck.
Figures 2, 3:
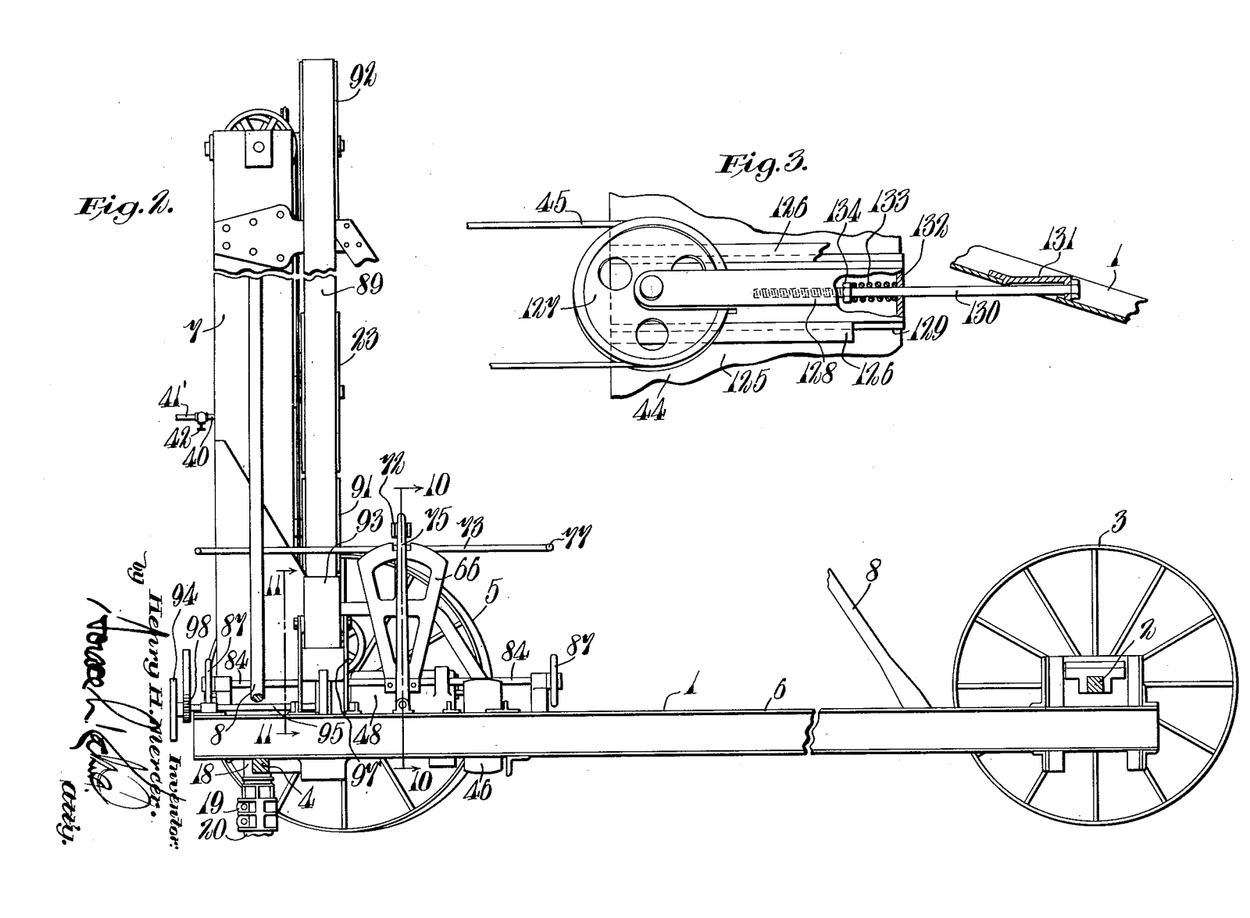
Fig. 2 is a vertical sectional elevation of the same partly broken away and taken on the line 2—2 of Fig. 1.
Fig. 3 is a fragmentary enlarged detail of the cable tightener.

To allow gradual feeding of the drill steel, hand operated means are provided which comprise a shaft 84 longitudinally disposed within the upper part of casing 48 of the gear transmission. A gear 86 carried by said shaft engages the gear 53. As shown in Fig. 1, shaft 84 has its ends provided with hand wheels 87 positioned substantially in a plane with handles 77 of the shaft 73. With the brakes released and lever 75 in neutral position, rotation of the hand wheels 87 will rotate the gears 86 and 53 along with the remaining gears in that train so as to rotate shaft 58 causing the cable 45 to move the steel up or down.

Figures 11, 12:
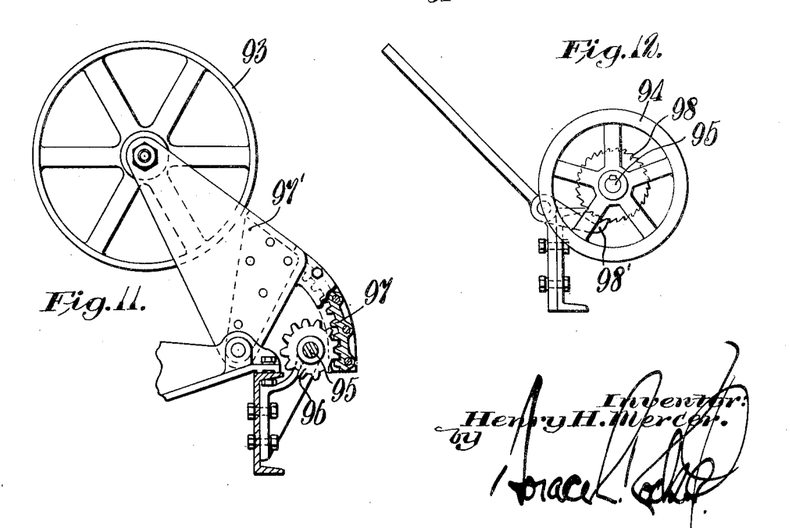
Fig. 11 is a fragmentary elevation of the belt idler taken on line 11—11 of Fig. 2.
Fig. 12 is a fragmentary elevation of means for holding the idler in position.

As described in my other case, the pulley 88 around which a belt 89 passes to drive the crank shaft 12 is actuated by the driving pulley 46. The belt 89 passes around pulleys 88 and 23, the latter being fixed to the crank shaft 12, around idler pulley 91 which is mounted on member 9 with pulley 23, around the fixed pulley 92 and down around belt tightening pulley 93. It will be seen that as the steel moves, the tension of the belt will remain the same. The belt tightener consists of hand wheel 94 mounted upon shaft 95 carrying a pinion 96 which engages rack 97 mounted upon a pivotally mounted pulley supporting arm 97', Fig. 11. Means for holding the pulley 93 in any desired position consists of a ratchet 98 fixed to shaft 95 and a cooperating hand operated pawl 98' mounted on the frame.

Figure 13:
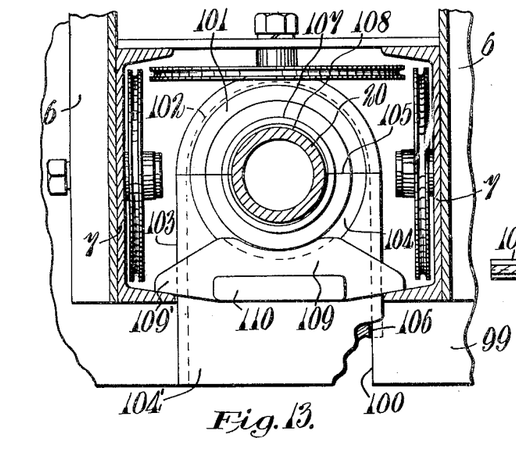
Fig. 13 is a fragmentary plan view of means for initially guiding the drill steel taken on line 13—13 of Fig. 5.
Figure 16:
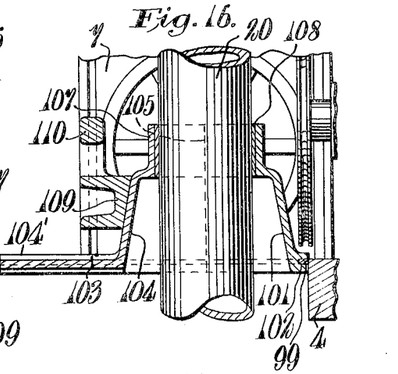
Fig. 16 is a sectional view of the steel guiding means.

In a mechanism of this type, it will be noted from Fig. 5 that when the drilling operation is being started the full length of the steel is supported by only the lower member 11 of the actuating mechanism. Thus the steel can be easily deflected. To prevent any deflection a guide is provided at the lower end of the guide members 7 to engage the steel 20, thus giving it two supporting positions. This guiding means comprises a horizontal plate 99, Figs. 4 and 7, extending across the frame and provided with a U-shaped opening 100 through which the drill steel can be inserted upon removal from the chuck 19. The sides of this opening are used to support the guide, Figs. 13 and 16, comprising a semi-circular rear member 101 having a groove 102 of sufficient width to receive the edge of plate 99. A second member 103 has a semicircular portion 104 with edges 105 cooperating with corresponding edges of the member 101. Projecting rearwardly from the circular portion 104 is a base 104' having longitudinal grooves 106 to receive the edges of the plate 99 in a manner similar to the groove 102. To insure a perfect fit, a small collar 107 projects upwardly from the cylindrical portions 101 and 104 and carries lining 108 to engage the periphery of the steel. To hold the two members of the clamp in rigid position a wedge 109 has laterally extending arms 109' to engage the rear flanges of the guiding members 7. Due to the inclined portion 104 the wedge 109 can be driven down tightly, thus forcing the clamps rigidly together; thereby the steel will be steadied and started straight. After the drilling operation has progressed sufficiently so that the walls of the hole will form a suitable support during the remainder of the operation, the clamp is removed by grasping the handle 110 and relieving the wedge of its pressure. The member 101 can also be removed as the width of the groove 102 is sufficient to allow slight manipulation of the member to cause its removal.

Figure 15:
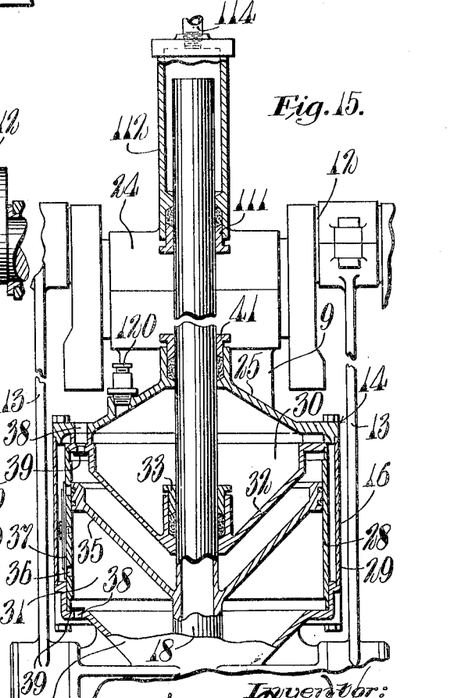
Fig. 15 is a modification of the same.

A modification of the generating means 14 is shown in Fig. 15. This means comprises, like the structure shown in Fig. 14, two connecting rods 13 pivotally mounted on the lower opposite sides of the cylinder 16 and connected at their upper ends to the crank shaft 12. The internal structure of the generating means is the same as that shown in Fig. 14. This modification differs therefrom by not allowing air to be pumped by the piston down through the drill steel, but uses only the external source. Air compressed by the piston acts only as a cushion. Means are provided for varying the pressure of the cushion within the chambers 30, 31 which varies the impact of the bit upon the material being drilled according to the desires of the operator or the material being drilled. The piston would ordinarily continue to build up pressure in the chamber 30 until it equaled the maximum pressure attainable within the cylinder 28. During this operation the valves 36 prevent back flow of fluid into the cylinder 28 from the chamber 30. Thus, on the stroke after compression the piston will draw in more air through valves 38. The degree of pressure in the chamber and consequent pressure of the cushion fluid is determined by adjusting a blowoff valve 120 communicating with chamber 30. To be able to pass cleansing fluid to the hole, shaft 18 projects directly through the glands 41 and 111, the latter fixed on a stationary cylinder 112 which is adapted to have telescopic relation with the upper end of the shaft. Cylinder 112 mounted upon the upper member 9 communicates as by pipe 114 with an external source of pressure fluid (not shown). In the operation of this device all of the cleansing fluid will be directly passed into the hole entirely independently of the piston and cylinder.

The chuck 19 for holding together the piston rod 18 and drill steel 20 comprises a body portion 150 having a cylindrical bore 151 within which the steel and rod project as shown in Figs. 17 and 18. In the side of the body 150 are upper and lower openings 152 and 152' allowing communication from the outside to the bore, the latter having recesses 153 adjacent the openings. Said recesses terminate at one end in recesses 154 having contacting faces 154' disposed substantially radially of the tool, while the other ends of the recesses 153 terminate in the openings 152 and 152'. Disposed within the recesses 153 are two sets of separate cooperating movable clamping members 155 and 155' having lugs 156 at their inner ends to engage the faces 154', the other ends of the members 155 projecting outwardly through the opening 152 so as to receive a tightening bolt 157 provided with ball and socket connections 158 to compensate for relative angular movement. The inner faces of these members are shaped to match the periphery of the steel and rod.

The operation is thought to be apparent for, by tightening the nuts 159 the upper members 155 will force the drill rod against the body portion while the lower members 155' will hold the drill steel in a similar manner.

Figures 4, 19, 20, 21:
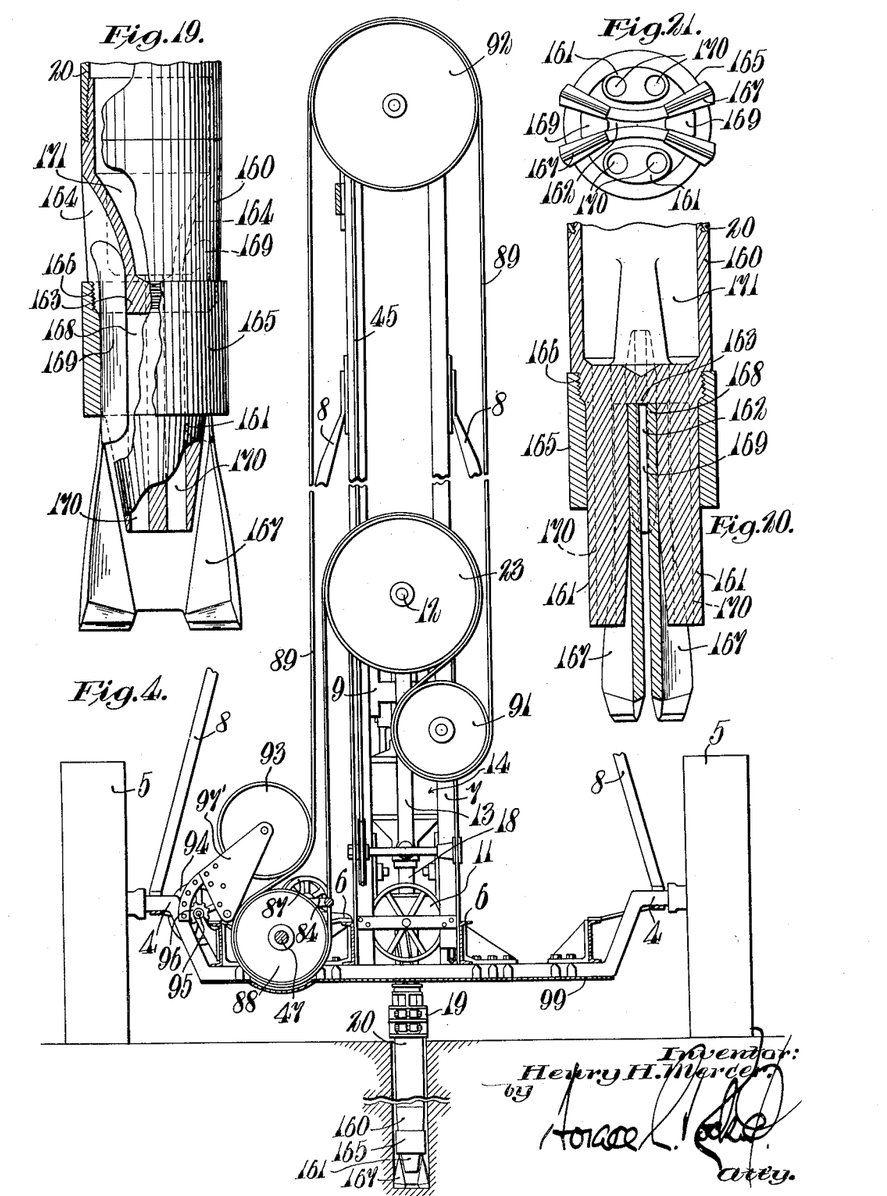
Fig. 4 is a front elevation of the drilling device taken on line 4—4 of Fig. 1.
Fig. 19 is an elevational view of the drill bit and holder partially broken away.
Figs. 20 and 21 are respectively vertical transverse sectional and bottom plan views of the same.

An improved type of drill bit and holder are provided as shown in Figs. 19 to 21 which comprise an upper cylindrical portion 160 screw threaded into the drill shank 20 from which oval shaped members 161 project downwardly, the same being spaced apart to form a transverse slot 162 which terminates against an abutment 163. Projecting upwardly from this slot and in the same plane therewith are outwardly inclined grooves 164. A collar 165 is screw threaded to the lower part of the body 160 as at 166 which is substantially adjacent the junction of the slots 164 and 162. The bit proper comprises two transversely curved bits 167 with their convex sides adjacent, the shanks 168 projecting upwardly into the slot 162 and held therein by wedges 169 inserted through grooves 164 down in between the convex sides of the bit shanks where cooperation with collar 165 causes a wedging action. To allow the cleansing fluid to reach the drill, the portions 161 have passages 170 extending throughout their length and terminating in the bore 171 of the hollow drill steel shank, it being noted that the lower ends of the members are tapered.

While I have in this application specifically described two forms which my invention may assume in practice, it will be understood that these forms are shown for purposes of illustration and that the invention may be modified and embodied in various other forms without departing from its spirit or the scope of the appended claims.

What I claim as new and desire to secure by Letters Patent is:

1. A drilling mechanism comprising a hollow drill steel, common means to actuate said steel and to simultaneously generate fluid under pressure and deliver the same to said drill, and auxiliary means for supplying additional pressure fluid to said steel independently of said other means.

2. A drilling mechanism comprising a hollow drill steel, means to actuate the same including movable fluid pressure generating means, and means for supplying fluid under pressure to said steel independently of said movable generating means and through one of the movable elements thereof, said means including a stationary member adapted to allow said fluid to be supplied to said movable means.

3. A drilling mechanism comprising a hollow drill steel, actuating means therefor, fluid pressure means connecting said steel and actuating means for transmitting motion from said actuating means to said steel, and means for supplying said steel with fluid under pressure independently of said actuating means.

4. A drilling mechanism comprising a frame including a horizontal plate having a slot therein, a drill bit and a drill rod connected thereto, said drill rod extending through said slot, and detachable means for guiding the drill bit comprising a laterally movable member receivable in and guided by said slot and having a guiding portion embracing said drill rod, said member being supported by the walls of said slot.

5. A drilling mechanism comprising a frame including a horizontal plate having a slot therein, a drill bit and drill rod connected thereto, said drill rod extending through said slot, detachable means for guiding the drill bit comprising a lateraly movable member receivable in and guided by said slot and supported by the walls thereof and having a guiding portion embracing said drill rod, and means engaging said frame for locking said laterally movable member in position.

6. A drilling mechanism comprising a frame including a horizontal plate having a slot therein, a drill bit and drill rod connected thereto, said drill rod extending through said slot, detachable means for guiding the drill bit comprising a laterally movable member receivable in and guided by said slot and having a guiding portion embracing said drill rod, and vertically adjustable means engaging said frame acting laterally against the same for holding said member in position.

7. A drilling mechanism comprising a frame having vertically extending laterally spaced member and a horizontal bottom plate having a slot therein, a drill bit and drill rod connected thereto, said drill rod extending through said slot, detachable means for guiding the drill bit comprising a laterally movable member receivable in and guided by said slot and having a guiding portion embracing said drill rod, and means for locking said member in position comprising an adjustable element engageable with said vertically extending laterally spaced members.

8. A drilling mechanism comprising a frame having vertically extending laterally spaced members and a horizontal bottom plate having a slot therein, a drill bit and drill rod connected thereto, said drill rod extending through said slot, detachable means for guiding the drill bit comprising a laterally movable member receivable in and guided by said slot and having a guiding portion embracing said drill rod, and means for locking said member in position comprising a vertically adjustable element wedged between said member and said vertically extending members.

9. In a drilling mechanism comprising a frame having a horizontal guideway, a drill bit and drill rod connected thereto, said drill rod extending between the sides of said guideway, detachable means for guiding said drill bit including an adjustable member slidably carried by the guideway on said frame and having a guiding portion engageable with said drill rod, and means for maintaining said member in position comprising wedge means acting between said frame and said guiding means.

10. A drilling mechanism comprising a frame having a horizontal guideway, a drill bit and drill rod connected thereto, said drill rod extending between the sides of said guideway, detachable means for guiding said drill bit comprising a laterally adjustable member slidably carried by the guideway on said frame and having a guiding portion engageable with said drill rod, and a vertically adjustable wedge engaging said frame and member for locking the later in position.

11. A drilling mechanism comprising a hollow rod for carrying the drilling tool, means for actuating the same comprising a positively reciprocated element and a yielding connection to said hollow rod, said yielding connection comprising relatively movable cylinder and piston elements, and means including a member telescopically received by said hollow rod for supplying pressure fluid thereto for cleansing a drilled hole.

12. A drilling mechanism comprising a hollow rod for carrying a cutting tool, means for reciprocating the same comprising a positively reciprocated element and a pneumatic connection to said rod, said connection comprising a cylinder attached to said element and a piston in said cylinder and attached to said rod, and means including a member telescopically received by the end of said rod for supplying fluid thereto for cleansing the hole.

13. In a drilling mechanism, a hollow drill steel, means for actuating said steel and to simultaneously supply fluid under pressure thereto, said means comprising a positively reciprocated cylinder and a piston movable therein to which said drill steel is attached, means for conducting fluid compressed by said piston and cylinder to said steel for cleansing a hole, and means for supplementing said cleansing fluid supply from an outside source.

14. A drilling mechanism comprising a hollow drill steel, means operatively connected thereto including relatively movable reciprocable cylinder and piston elements adapted to generate fluid pressure for actuating said drill steel, means for supplying fluid pressure from said cylinder through said piston to said hollow drill steel, and means for supplying fluid pressure to said steel in addition to that generated by said elements.

15. In a drilling mechanism, a cutting tool, a hollow drill rod attached thereto, means for actuating said tool comprising a positively reciprocated cylinder, a piston movable therein and a hollow piston rod secured to said piston and forming a continuation of said drill rod, means for delivering fluid compressed by said cylinder and piston to said cutting tool for cleansing purposes, and means for supplementing such cleansing fluid supply including a stationary hollow pipe telescopically received in said cylinder and piston rod, said pipe being connected to an outside source of fluid under pressure.

16. A drilling mechanism comprising a stationary frame, a drill bit and a drill rod connected thereto, a movable frame slidably mounted in said stationary frame, mechanism for reciprocably actuating said drill rod and bit carried by said movable frame, a guide for said drill rod carried by said movable frame, and a second guide for said rod mounted in the stationary frame.

In testimony whereof I affix my signature.

HENRY H. MERCER.